(12) United States Patent
Deng et al.

(10) Patent No.: US 8,211,335 B2
(45) Date of Patent: Jul. 3, 2012

(54) METHOD FOR MAKING POLYMER, COATING ELECTRODE, AND ASSOCIATED POLYMER AND ELECTRODE

(75) Inventors: Zhigang Deng, Shanghai (CN); Hai Yang, Shanghai (CN); Liping Zheng, Shanghai (CN); Su Lu, Shanghai (CN); Lin Chen, Shanghai (CN); Hui Liu, Shanghai (CN); Wei Cai, Shanghai (CN); Xianguo Yu, Shanghai (CN)

(73) Assignee: General Electric Company, Niskayuna, NY (US)

( * ) Notice: Subject to any disclaimer, the term of this patent is extended or adjusted under 35 U.S.C. 154(b) by 457 days.

(21) Appl. No.: 12/550,827

(22) Filed: Aug. 31, 2009

(65) Prior Publication Data
US 2011/0049430 A1 Mar. 3, 2011

(51) Int. Cl.
*H01B 1/00* (2006.01)
*C08F 26/02* (2006.01)
*C08F 20/00* (2006.01)
*C08F 12/28* (2006.01)
*C08G 75/00* (2006.01)
*B05D 5/12* (2006.01)

(52) U.S. Cl. .......... 252/500; 427/77; 526/302; 526/306; 526/310; 528/321

(58) Field of Classification Search .................. 252/500; 526/302, 306, 310; 528/321; 427/77
See application file for complete search history.

(56) References Cited

U.S. PATENT DOCUMENTS

| 4,617,321 A | 10/1986 | MacDonald |
| 5,264,249 A | 11/1993 | Perrault et al. |
| 6,117,960 A | 9/2000 | Kohlhammer et al. |

FOREIGN PATENT DOCUMENTS
JP 2005-063690 * 3/2005

OTHER PUBLICATIONS

Search Report and Written Opinion From corresponding PCT Application No. PCT/US2010/045480, mailed on Jun. 22, 2011.
JP 2005063690 Abstract Mar. 10, 2005.

* cited by examiner

*Primary Examiner* — Mark Kopec
*Assistant Examiner* — Jaison Thomas
(74) *Attorney, Agent, or Firm* — Mary Louise Gioeni

(57) ABSTRACT

A method is provided, comprising: copolymerizing a monomer comprising at least two amide groups, a monomer of formula (a)

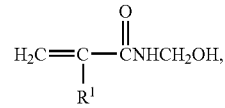

and a sulfonic acid or salt monomer, wherein $R^1$ is $CH_3$ or H. A polymer made by the method is provided. A method for coating an electrode is provided, comprising: providing an electrode; providing a solution of a free radical initiator, a monomer comprising at least two amide groups, a monomer of formula (a)

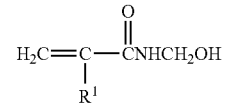

and a sulfonic acid or salt monomer; wetting the electrode with the solution; and heating the wetted electrode; whereby the monomer comprising at least two amide groups, the monomer of formula (a), and the sulfonic acid or salt monomer are copolymerized; wherein $R^1$ is $CH_3$ or H. An electrode coated by the method is provided.

8 Claims, No Drawings

METHOD FOR MAKING POLYMER, COATING ELECTRODE, AND ASSOCIATED POLYMER AND ELECTRODE

BACKGROUND

Ion exchange polymers are useful in many applications, for example, making ion exchange membranes or coatings for ion separation processes. Common technique for producing ion-exchange polymers involves polymerization of a non-ionic, non-water soluble, di-ethylenic cross-linking agent, for example, divinyl benzene with a monomer such as styrene in a non-aqueous solvent such as diethyl-benzene. The resulting solid polymer, for example, in sheet or membrane form is equilibrated or washed several times with a solvent such as ethylene dichloride to remove and replace the diethyl-benzene solvent. Where cation exchange membranes are desired, the membranes are then reacted with a solution of sulfur trioxide and ethylene dichloride to form sulfonate groups which upon washing with methanol and neutralization with sodium bicarbonate gives the polymer strongly basic ion-exchange properties. The water insoluble monomers and the polymerization reaction and subsequent reaction carried out in non-aqueous solvents necessitate chemical disposal problems with attendant loss of the organic solvents.

Water-soluble cross-linking agents polymerizable in aqueous solvent systems have been developed to overcome the above-mentioned problems. Cross-linking of the polymer occurs by means of a condensation reaction between two monomers and takes place simultaneously with the polymerization, so no di-ethylenic monomers are required. At the same time, the expense of petroleum derived solvents and the problem of their disposal are eliminated.

However, most currently available water-soluble cross-linking agents are expensive and not environment friendly. In the meantime, some applications, e.g., supercapacitor electrodes, prefer polymers that have low resistance, low swelling ratio and good coating morphology and that can be coated to decrease the energy consumption and increase current efficiency of the electrodes.

Thus, it would be desirable to have a method for making a low swelling ratio polymer from water soluble, cheap and environment friendly materials and a method for coating an electrode with the polymer to reduce resistance and increase current efficiency of the electrode.

BRIEF DESCRIPTION

In accordance with embodiments described herein, a method is provided, comprising: copolymerizing a monomer comprising at least two amide groups, a monomer of formula (a)

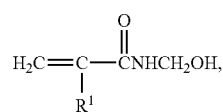

and a sulfonic acid or salt monomer, wherein $R^1$ is $CH_3$ or H.

In accordance with embodiments described herein, a polymer made by the above method and a membrane comprising the polymer are also provided.

In accordance with embodiments described herein, a method for coating an electrode is provided, comprising: providing an electrode; providing a solution of a free radical initiator, a monomer comprising at least two amide groups, a monomer of formula (a)

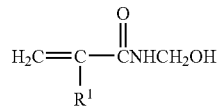

and a sulfonic acid or salt monomer; wetting the electrode with the solution; and heating the wetted electrode; whereby the monomer comprising at least two amide groups, the monomer of formula (a), and the sulfonic acid or salt monomer are copolymerized; wherein $R^1$ is $CH_3$ or H.

In accordance with embodiments described herein, an electrode coated by the above method is provided.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about" or "substantially", is not to be limited to the precise value specified. In some instances, the approximating language may correspond to the precision of an instrument for measuring the value.

In accordance with embodiments described herein, a method is provided, comprising: comprising copolymerizing a monomer comprising at least two amide groups, a monomer of formula (a)

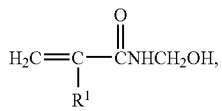

and a sulfonic acid or salt monomer, wherein $R^1$ is $CH_3$ or H.

In another aspect, a polymer made by the method and a membrane comprising the polymer are provided.

In accordance with embodiments described herein, a method for coating an electrode is provided, comprising: providing an electrode; providing a solution of a free radical initiator, a monomer comprising at least two amide groups, a monomer of formula (a)

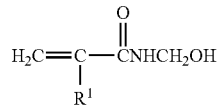

and a sulfonic acid or salt monomer; wetting the electrode with the solution; and heating the wetted electrode; whereby the monomer comprising at least two amide groups, the monomer of formula (a), and the sulfonic acid or salt monomer are copolymerized; wherein $R^1$ is $CH_3$ or H.

In accordance with embodiments described herein, an electrode coated by the above method is provided.

Suitable monomer units of formula (a) are, for example, water-soluble, ethylenically unsaturated compounds which can be polymerized by free radicals and contain N-methylol groups (—NH—CH$_2$OH) or etherified derivatives thereof (—NH—CH$_2$OR, where R=C$_1$-C$_6$ alkyl). Preferred monomer units are N-methylolacrylamide (N-(hydroxymethyl)acrylamide, NMA), N-methylolmethacrylamide (NMMA), N-(isobutoxymethyl)-acrylamide (IBMA), N-(isobutoxymethyl)-methacrylamide and N-(n-butoxymethyl)-acrylamide (NBMA). Particularly preferred monomer units are N-methylolacrylamide and N-(isobutoxymethyl)-acrylamide.

In some embodiments, the sulfonic acid or salt monomer is of formula (b):

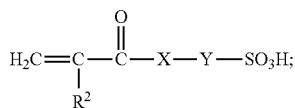

wherein R$^2$ is CH$_3$ or H; X is NH or O and Y is alkyl. Suitable sulfonic acid or salt monomers are, for example, water-soluble, ethylenically unsaturated compounds which can be polymerized by free radicals and contain sulfonic acid or sulfonate groups —SO$_3$M, where M=H or an alkali metal, ammonium or alkaline earth metal ion. Preferred monomer units are 2-acrylamido-2-methylpropanesulfonic acid, styrene sulfonic acid, sulfoalkyl(meth)-acrylates, sulfoalkyl itaconates, preferably in each case with a C$_1$ to C$_6$ alkyl radical, and vinylsulfonic acid and ammonium, alkali metal or alkaline earth metal salts thereof. Particularly preferred monomer units are 2-acrylamido-2-methylpropanesulfonic acid, styrenesulfonic acid, p-styrenesulfonic acid, sulfopropyl acrylate, sulfopropyl itaconate and vinylsulfonic acid and ammonium, sodium, potassium and calcium salts thereof.

As used herein the term "alkyl" refers to a saturated hydrocarbon radical. Examples of suitable alkyl groups include n-butyl, n-pentyl, n-heptyl, iso-butyl, t-butyl, and iso-pentyl.

In some embodiments, the monomer comprising at least two amide groups is selected from carbonyldiamine and a compound of formula (c)

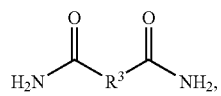

wherein R$^3$ is NH, aliphatic radical or ether unit.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" organic radicals substituted with a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C$_6$ aliphatic radical comprising a methyl group, the methyl group being a functional group which is an alkyl group. Similarly, the 4-nitrobut-1-yl group is a C$_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g. —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e. —CHO), hexyl, hexamethylene, hydroxymethyl (i.e. —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH2)$_9$-) is an example of a C$_{10}$ aliphatic radical.

As used herein, the term "ether unit" refers to a substituted or unsubstituted alkylene moiety bonded to an oxygen, and generally corresponds to the formula —C(R$^4$)$_2$—C(R$^4$)$_2$—O— wherein R is separately in each occurrence hydrogen, halogen, a nitro group, a cyano group, a C$_{1-20}$ hydrocarbyl group or a C$_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyl dioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group.

As used herein, the term "amide group" refers to —R$^5$CONH$_2$ group, wherein R$^5$ is hydrogen or alkyl.

In some embodiments, the monomer comprising at least two amide groups is selected from biuret and succinamide.

Water soluble here in general means that the solubility in water at 23° C. is at least 10% by weight.

The preparation of the copolymers according to the invention is preferably carried out by free radical polymerization in aqueous solution at a reaction temperature of preferably 40° C. to 80° C. The polymerization can be carried out by initially introducing all or individual constituents of the reaction mixture into the reaction vessel, or by initially introducing portions of the components and topping up the constituents or individual constituents of the reaction mixture.

The initiation is carried out by means of the customary water-soluble agents which form free radicals, which are preferably employed in amounts of 0.01 to 3.0% by weight, based on the total weight of the monomers. Examples of these are ammonium and potassium persulphate, 2,2'-(azobis(2-methylpropionamidine)dihydrocloride, hydrogen peroxide, and potassium, sodium and ammonium peroxodiphosphate. If appropriate, the free radical initiators mentioned are also combined in a known manner with 0.01 to 1.0% by weight, based on the total weight of the monomers, of reducing agents, it being possible for the polymerization to be carried out at lower temperatures in this case. For example, alkali metal formaldehydesulfoxylates and ascorbic acid are suitable.

The following examples are included to provide additional guidance to those of ordinary skill in the art in practicing the claimed invention. Accordingly, these examples do not limit the invention as defined in the appended claims.

Monomer Solution Preparation:

2-Acrylamido-2-methyl-1-propanesulfonic acid (20 g, obtained from Sigma-Aldrich®), 28 g N-(hydroxymethyl) acrylamide and 8.3 g urea (carbonyldiamine) were mixed together with 44 g deioned water under strong stirring. After the monomers were well dissolved, 1 g 2,2'-(azobis(2-methylpropionamidine)dihydrocloride was added into the solution and the solution was stirred until the 2,2'-(azobis(2-methylpropionamidine)dihydrocloride was dissolved.

2,2'-(Azobis(2-methylpropionamidine)dihydrocloride was obtained from Sigma-Aldrich®. N-(hydroxymethyl) acrylamide and urea were obtained from Sinopharm Chemical Reagent Co, Ltd., Shanghai, China.

Coating for Electrode:

A carbon electrode (16 cm*32 cm*1.0 mm) prepared by pressing a calendered active carbon sheet onto a Ti mesh and sandwiched between two pieces of poly(ethylene terephthalate) (PET) films (16 cm*32 cm) was sealed into a thermoplastic bag while 3 small openings (10 mm in diameters) were left open on the thermoplastic bag. The prepared solution was added into the thermoplastic bag through the openings. The entire thermoplastic bag was then sandwiched between two pieces of glass plates (24 cm*40 cm) with a U type rubber gasket (17 cm*34 cm) located between the thermoplastic bag and the glass plates to make sure the whole electrode surface immerged in the solution. The assembly was put into a vacuum cabinet and degassed for 6 minutes to accelerate wetting of the solution to the electrode. After that, the assembly was taken out of the vacuum cabinet and the U type gasket was disassembled therefrom. Excessive solution was extruded from the thermoplastic bag and clamps were used to clamp the two glass plates toward each other. Put the new assembly into an oven at 80° C. for 2.5 hours.

After the new assembly cooled down, the coated electrode was taken out and its thickness was measured out to be 1.1 mm compared with 1.0 mm of uncoated bare electrode. Some dry polymer scrap samples were taken from the thermoplastic bag to test swelling ratio and —$SO_3^-$ density of the polymer. The resistance and current efficiency of the electrode were tested in an assembled cell.

Swelling Ratio

Dry polymer sample (0.327 g) was put into a small bottle and 1.129 g of distilled water was added into the bottle. After 24 hours, the swelled sample was tested with low field NMR. Two kinds of proton signals appeared in the low field NMR spectra. One is for adsorbed water (swelling water) and the other is for free water. The free water signal has a linear relation with free water proton intensity, i.e., by changing the total amount of water in the water-saturated polymer sample, corresponding variation of free water signal intensity were got. Thus, a regression function of free water amount with free water proton intensity was obtained. The free water amount was calculated from free water proton intensity through the regression function to be 0.669 g. The adsorbed water amount was calculated as follows: Adsorbed water=Total water−Free water=1.129 g−0.669 g=0.46 g. Swelling ratio (weight)=(adsorbed water/dry polymer) *100%=0.46/0.327*100%=140%.

—$SO_3^-$ Density

Dry polymer (1.32 g) was soaked in HCl solution (200 ml, 1 N) for 24 hours. The soaked polymer was rinsed with deionized water until the filtrate became neutral. Then put the polymer into NaCl solution (100 ml, 1 N) to equilibrate it for 24 hours. Took out 10 ml of the equilibrated solution and titrated the 10 ml of the equilibrated solution with NaOH solution (0.01 N). —$SO_3^-$ density=$\Delta V_{NaOH}$*0.01 N*10/dry polymer=(23.5*0.01*10)/1.32=1.78 Millimole per gram dry polymer.

Resistance

The coated electrode was assembled with a counter bare carbon electrode while a polymer flow spacer (size: 16 cm*24 cm, thickness: 0.7 mm), which was prepared by heat pressing a polymer mesh into a ethylene vinyl acetate (EVA) polymer film to form a flow channel, was sandwiched between the two electrodes to test the resistance thereof in 1600 ppm NaCl solution. Land battery tester CT2001B and CT2001D from Wuhan Jinnuo Electronics Co., Ltd., Wuhan, China was used for the testing and the charge current was 1250 mA.

The coated electrode resistance was calculated as follow: Resistance=cell resistance−solution resistance−counter electrode resistance. Cell resistance was obtained through the Land battery tester CT2001B and CT2001D (Cell resistance=$\Delta$Voltage/current=0.125/1.25=0.10 Ohm). The solution resistance was calculated through the solution conductivity (solution resistance=1/conductivity*thickness=1/3.2*0.07=0.02 Ohm). Counter electrode resistance was pretested in a two identical bare carbon electrodes cell using the same testing method as with the coated electrode in which cell resistance=0.12 Ohm and solution resistance was 0.02 Ohm. The counter electrode resistance=(0.12−0.02)/2=0.05 Ohm. Thus, coated electrode resistance=0.10−0.02−0.05=0.03 Ohm.

For a comparative study, a traditional IX membrane modified carbon electrode in which a piece of IX membrane (CR-67, GE Water & Process Technologies, Watertown, Mass., US) was attached onto a bare carbon electrode, was assembled with a bare carbon electrode while a polymer flow spacer (size: 16 cm*24 cm, thickness: 0.7 mm) was sandwiched between the two electrodes to test the resistance thereof in 1600 ppm NaCl solution. Land battery tester CT2001B and CT2001D was used and the charge current was 1250 mA.

IX membrane modified carbon electrode resistance=Cell resistance−solution resistance−counter electrode resistance. The Cell resistance=$\Delta$Voltage/current=0.24/1.25=0.19 Ohm. Solution resistance=1/conductivity*thickness=1/3.2*0.07=0.02 Ohm. Counter electrode resistance=(0.12−0.02)/2=0.05 Ohm. Thus, the IX membrane modified carbon electrode resistance=0.19−0.02−0.05=0.12 Ohm.

The coated electrode resistance was 15.36 Ohm*$cm^2$ (0.03 Ohm*512 $cm^2$) compared with 61.44 ohm*$cm^2$ (0.12*500 $cm^2$) of the IX membrane modified carbon electrode.

Current Efficiency

Current efficiency was also tested in a two electrodes cell in 1600 ppm NaCl. Current efficiency=(Mole of removed salt*96500 coulombs/mole)/(coulombs of total used charges). The mole of removed salt was obtained through calculation of the solution conductivity change from feed solution to dilute solution to be 4.4 mmol. The total used charges were read through the Land battery tester CT2001B and CT2001D to be 450 coulombs. Therefore, Current efficiency=(Mole of removed salt*96500 coulombs/mole)/(coulombs of total used charges)=(4.4*96500*0.001/450) *100%=94.4%.

The embodiments described herein are examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A method for coating an electrode comprising:
providing an electrode;
providing a solution of a free radical initiator, a monomer comprising at least two amide groups, a monomer of formula (a)

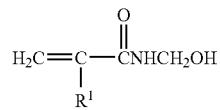

and a sulfonic acid or salt monomer;
wetting the electrode with the solution; and
heating the wetted electrode;
whereby the monomer comprising at least two amide groups, the monomer of formula (a), and the sulfonic acid or salt monomer are copolymerized;
wherein
$R^1$ is $CH_3$ or H.

2. The method of claim 1, wherein the sulfonic acid or salt monomer is of formula (b):

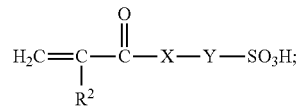

wherein R is $CH_3$ or H; X is NH or O and Y is alkyl.

3. The method of claim 2, wherein the sulfonic acid or salt monomer is 2-acrylamido-2-methylpropane sulfonic acid.

4. The method of claim 1, wherein the sulfonic acid or salt monomer is p-styrene sulfonic acid.

5. The method of claim 1, wherein the monomer of formula (a) is N-(hydroxymethyl)acrylamide.

6. The method of claim 1, wherein the free radical initiator is 2,2'-(azobis(2-methylpropionamidine)dihydrocloride, ammonium persulphate, or potassium persulphate.

7. The method of claim 1, wherein the monomer comprising at least two amide groups is carbonyldiamine.

8. An electrode coated by the method of claim 1.

* * * * *